US011106948B2

(12) United States Patent
Vichare et al.

(10) Patent No.: US 11,106,948 B2
(45) Date of Patent: Aug. 31, 2021

(54) CLASSIFYING TELEMETRY DATA TO IDENTIFY AND REMEDIATE ISSUES

(71) Applicant: Dell Products L. P., Round Rock, TX (US)

(72) Inventors: Nikhil M. Vichare, Austin, TX (US); Arturo Ramos, Jr., Austin, TX (US)

(73) Assignee: Dell Products L.P., Round Rock, TX (US)

( * ) Notice: Subject to any disclaimer, the term of this patent is extended or adjusted under 35 U.S.C. 154(b) by 686 days.

(21) Appl. No.: 16/021,171

(22) Filed: Jun. 28, 2018

(65) Prior Publication Data

US 2020/0005093 A1    Jan. 2, 2020

(51) Int. Cl.
*G06K 9/62* (2006.01)
*G06F 8/61* (2018.01)
*H04Q 9/02* (2006.01)
*G06N 20/00* (2019.01)

(52) U.S. Cl.
CPC ............ *G06K 9/6267* (2013.01); *G06F 8/61* (2013.01); *G06K 9/6215* (2013.01); *H04Q 9/02* (2013.01); *G06N 20/00* (2019.01)

(58) Field of Classification Search
CPC ............ G06F 11/0751; G06F 11/0793; G06F 2201/86; G06K 9/6215; G06K 9/6272
See application file for complete search history.

(56) References Cited

U.S. PATENT DOCUMENTS

| 9,860,688 | B2* | 1/2018 | Kulkarni | H04W 84/18 |
| 2008/0069008 | A1* | 3/2008 | Park | H04W 64/00 370/254 |
| 2010/0217618 | A1* | 8/2010 | Piccirillo | G06Q 30/04 705/2 |
| 2011/0184676 | A1* | 7/2011 | Gershinsky | H04Q 9/00 702/62 |
| 2016/0364467 | A1* | 12/2016 | Gupta | G06N 20/00 |
| 2017/0289650 | A1* | 10/2017 | Schattmaier | G08B 31/00 |
| 2018/0034654 | A1* | 2/2018 | Mumme | G02B 25/00 |

* cited by examiner

*Primary Examiner* — Thomas S McCormack
(74) *Attorney, Agent, or Firm* — Egan, Enders & Huston LLP.

(57) ABSTRACT

In some examples, a server may receive, from a computing device, data identifying an event that occurred on the computing device. The server may determine a plurality of features associated with the event, determine a distance between individual features of the plurality of features and individual centroids of a plurality of clusters, and determine that a particular distance between a particular feature of the plurality of features and a centroid of a particular cluster of the plurality of clusters is a shorter distance than the distance between other features of the plurality of features and other centroids corresponding to other clusters of the plurality of clusters. The server may determine a classification of the event based on the particular cluster and determine that the classification is a remediable issue. Based on the classification, the server may select and perform a remediation action from a plurality of remediation actions.

20 Claims, 5 Drawing Sheets

CLASSIFYING TELEMETRY DATA TO IDENTIFY AND REMEDIATE ISSUES

BACKGROUND OF THE INVENTION

Field of the Invention

This invention relates generally to computing devices and, more particularly to receiving telemetry data from multiple (e.g., millions of) computing devices, where the telemetry data indicates the occurrence of various events on each computing, determining whether a particular set of events in the telemetry data indicates an issue, such as compromised key or application bug, and remediating the issue.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A computer manufacturer, such as, for example, Dell®, may install a software agent on each computing device (e.g., laptop, tablet, desktop, server, and the like) before the computing device is shipped. The software agent installed on a computing device may gather data associated with the computing device and periodically send the gathered data ("telemetry data") to one or more servers (e.g., cloud-based servers). The manufacturer may, for example, analyze the data to determine how users are using the products (e.g., computing devices).

In some cases, a bug in the software, hardware, firmware (or any combination thereof) of the computing device may cause the computing device to send significantly more (e.g., at least 20% more) data than normal. If multiple computing devices have the same bug, then the multiple computing devices may send so much data that the servers are overwhelmed, thereby causing a (1) denial of service for other (e.g., normally operating) computing devices, (2) crash of the servers, or (3) another type of issue.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a server may receive, from a computing device, data identifying an event that occurred on the computing device. The server may determine a plurality of features associated with the event, determine a distance between individual features of the plurality of features and individual centroids of a plurality of clusters, and determine that a particular distance between a particular feature of the plurality of features and a centroid of a particular cluster of the plurality of clusters is a shorter distance than the distance between other features of the plurality of features and other centroids corresponding to other clusters of the plurality of clusters. The server may determine a classification of the event based on the particular cluster and determine that the classification is a remediable issue. Based on the classification, the server may select and perform a remediation action from a plurality of remediation actions.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
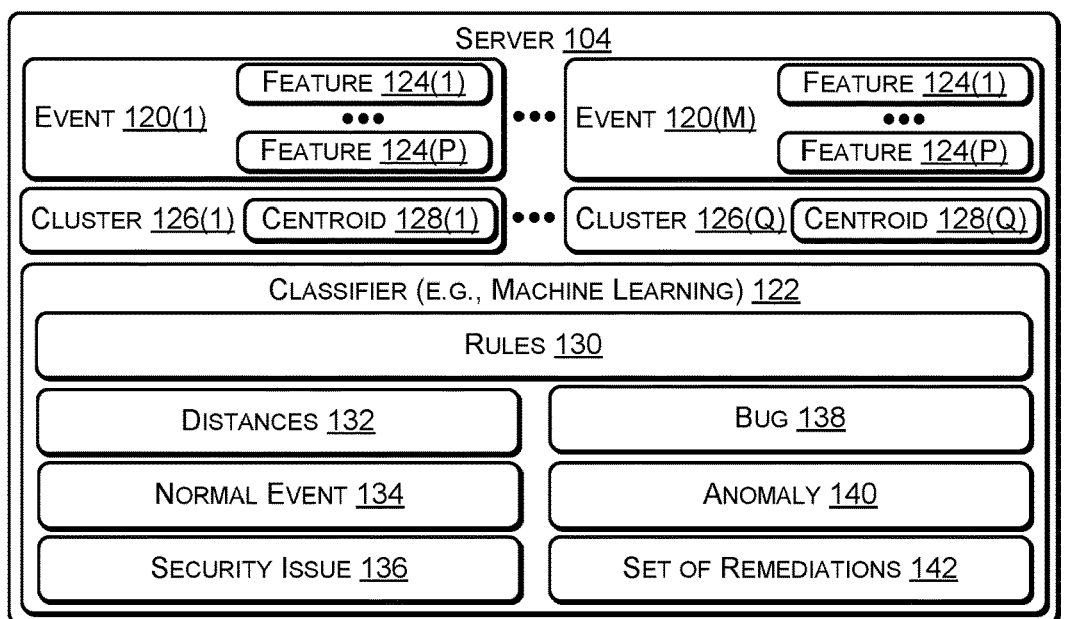
FIG. 1 is a block diagram of a system that includes a computing device sending data to a server, according to some embodiments.
Figure 1:
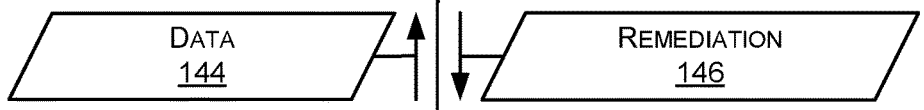
Figure 1:
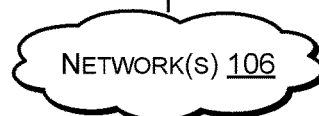
Figure 1:
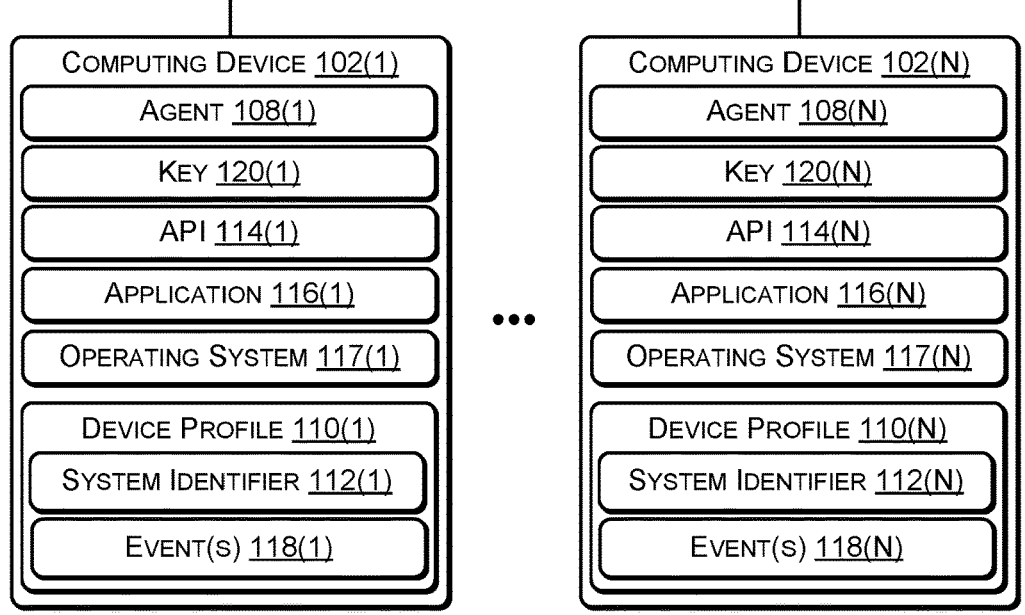

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

A computer manufacturer, such as, for example, Dell®, may install a software agent on each computing device (e.g., laptop, tablet, desktop, server, and the like) before the computing device is shipped. The software agent installed on the computing device may gather data associated with the computing device, such as when the computing device is turned on for very first time, determine which retailer (e.g., Walmart®, Dell.com, Best Buy®, and the like) the computing device was purchased from, when an operating system that was installed by the factory crashed and what caused the crash (e.g., software bug, hardware bug, firmware bug or the like), when a software application that was installed prior to shipping crashed and what caused the crash, whether a blue screen of death (BSOD) occurred, how often an involuntary (e.g., non-user initiated) restart of the computing device has occurred, when the user selected (e.g., clicked on) a particular selection (e.g., to provide a rating for the computing device on a review site), and other device-related information. The data sent by the agent may include a unique identifier, such as a service tag or a serial number, that enables the servers to identify the computing device, thereby enabling the servers to identify the device's original hardware profile (e.g., which hardware components were installed at the factory) and the device's original software profile (e.g., which software applications and operating system were installed at the factory). Each agent installed on a computing device may use a key, such as an application programming interface (API) key, to prevent unauthorized agents (or other entities) from sending data to the servers. An API key is a code passed by the agent when calling an API to identify the agent and indicate that the agent is authorized to access the API to send the data.

The agent may periodically (e.g., at a predetermined time interval) or in response to a particular set of events (e.g., multiple restarts within a particular time interval, multiple crashes by a particular software application within a particular time interval, and the like), send the gathered data to the servers (e.g., cloud-based servers associated with the manufacturer). The servers are an example of an IHS. The servers may analyze the data to identify how users are using the computing device, e.g., which software applications are being used, an amount of time each application is being used, when (e.g., time of day, day of the week, and the like) the application is being used, which hardware components are being used, which peripherals have been or are current connected to the computing device, and the like. In some cases, the manufacturer of the computing device may perform an analysis of the data sent by the agent and make software, hardware, and/or peripherals recommendations based on the analysis. For example, if the computing device spends a large amount of time executing applications that make use of a hard drive or the main memory (e.g., random access memory (RAM)), the manufacturer may send an offer to upgrade the hard drive from a mechanical drive to a solid-state drive (SSD) or purchase additional memory.

In some cases, a bug in the software, hardware, firmware (or any combination thereof) of the computing device may cause the computing device to send significantly more (e.g., at least 20% more) data than normal. If multiple computing devices have a similar or same bug, then the multiple computing devices may send an amount of data to the servers sufficient to overwhelm the servers. In other cases, the API key may be stolen or hacked and used by one or more unauthorized entities to send an amount of data to the servers sufficient to overwhelm the servers. When the servers are overwhelmed by data, undesirable consequences may occur, such as, for example, a (1) denial of service (DoS) for other (e.g., normally operating) computing devices, (2) crash of the servers, (3) telemetry data becoming lost or discarded due to the inability of the servers to process the telemetry data at the rate at which the telemetry data is being received, or (4) another type of issue caused by a large (e.g., more than expected/normal) amount of data.

The systems and techniques described herein provide examples of a system and techniques by which servers receiving telemetry data from multiple computing devices classify events included in the telemetry data, determine (e.g., based on the classification) whether the events being received are normal, a result of a bug, a result of a security issue (e.g., stolen/hacked API key), and, if an issue (e.g., bug, security issue, or the like) is found, remediate the issue. The classification may be performed by using a machine learning classifier to classify events received from each computing device. For example, the servers may extract features from each event and determine a distance from each feature to a centroid of each cluster of multiple clusters. Each event may be classified based on determining the shortest distance between a particular feature of an event and a particular cluster of the multiple clusters. The clusters may enable a set of (e.g., one or more) events sent from a computing device to be identified as a set of normal events, a security issue (e.g., hacked or stolen API key), a bug, an anomaly, or another classification. The bug may include a software bug, a hardware bug, or a firmware bug. The software bug may include a bug in one or more software applications that are being executed by the computing device. The firmware bug may be a bug in the firmware of the computer, such as in the basic input output system (BIOS), or in a hardware component, such as a hard drive, SSD, network interface card (NIC), or another hardware component. The hardware bug may be a bug in a hardware component, such as, for example, a bug in a processor that causes software applications to crash or causes the operating system to restart.

Based on how the server classifies the set of events received from a computing device, the server may perform one or more remediation actions to address the issue(s). For example, for a software bug associated with a software application, the servers may instruct the agent to ignore events caused by the software application, instruct the software application to stop sending data, temporarily deactivate the API key of the software application, the servers may ignore/discard the data received from the software application (or from the computing device), the servers may instruct the computing device to uninstall the application and download and install a newer version of the application, perform another type of remediation, or any combination thereof. For a firmware bug, the servers may instruct the agent to ignore events caused by the firmware, the servers may ignore/discard events associated with the firmware, the servers may instruct the computing device to download and re-install and/or update the firmware, perform another type of remediation, or any combination thereof. For a hardware bug, the servers may instruct the agent to ignore events caused by the hardware, the servers may ignore/discard events associated with the hardware, the servers may issue a service ticket to enable the computing device to be serviced to replace the malfunctioning hardware, perform another type of remediation, or any combination thereof.

Thus, one or more servers associated with a manufacturer may receive telemetry data from multiple (e.g., millions) of computing devices. The telemetry data may include information about various events that occurred on each computing device and may include a unique identifier (e.g., serial number, service tag, or the like) that uniquely identifies each computing device. An agent on each computing device may send, via an API and using an API key, the telemetry data at a predetermined time interval (e.g., every minute, every hour, every 6 hours, every day, or the like) or in response to one or more events (e.g., an application or an operating system crashed and restarted automatically at least a predetermined number of time). The servers may analyze and classify each event (or set of events) in the telemetry data. For example, the servers may determine features associated with each event and determine a distance between each feature and a centroid of each cluster of multiple clusters. The servers may determine which of the distances is the shortest distance, e.g., between a particular feature (or set of features) and a centroid of a particular cluster. The proximity to the particular cluster may be used to classify the event (or set of events), e.g., as normal, a security issue (e.g., hacked, stolen, or spoofed API key), a bug, an anomaly, or the like. For event(s) that are not classified as normal, the severs may initiate (or instruct the computing device to initiate) a remediation procedure to address the issue. The remediation may result in fewer such events (e.g., caused by a security issue, a bug, an anomaly, or the like) being sent to the servers. In this way, the remediation may reduce the number of events sent to the servers, thereby reducing the possibility of overwhelming the servers and causing a DoS, lost/discarded events, slow processing of events, or the like.

An application profile can be built using probability distributions of: (1) a number of new devices shipped per day (e.g., features may be determined for new devices by day of the week, time of day, weekday vs. weekend, or the like), (2) active devices per day (e.g., features may be determined for active devices by day of the week, time of day, weekday vs. weekend, or the like), (3) volume of events per day, (4) volume of event types per day (e.g., type of event includes a heartbeat indicating device is operating normally, interaction with a user interface (UI) such as click events and button clicks, downloads of drivers, software, and firmware, installation of drivers, software and/or firmware, and the like, (5) event types based on geographic location (e.g., sudden surge of events from devices located Poland), and (6) event types normalized by device attributes such as model, operating system, processor, chassis, location, and the like.

Using machine learning, such as K-means clustering, the server may analyze the events to detect anomalies in a software application's activity to determine if the software application has been compromised. If the application has been compromised, a latest version of the application may be downloaded and installed (e.g., reinstalling the software application) to wipe out and clean up any compromised (e.g., infected) executables, libraries, and the like. If the same or similar anomaly is detected again, the server may send an instruction to activate a "kill switch" in the application. Activating the kill switch may include terminating the application, uninstalling the application, instructing the application to stop generating events, or the like.

The machine learning module (e.g., classifier) may be located on the computing device itself or on a cloud-based server. Thus, while FIG. 1 describes a cloud-based classifier, in some cases, the classifier may be located in the computing devices. For example, the computing device may include a machine learning model that can be run at selected intervals to measure various metrics, such as, for example, the application's usage of (1) a central processing unit (CPU), (2) network bandwidth, (3), memory usage, and other computing resources. For example, if an application is compromised as a tool to commit denial of service (DoS) attacks, the application would have higher than normal network bandwidth usage. As another example, if an application is downloading and invoking administrator privileges to install multiple executable files, the machine learning may detect a security issue. The security issue may be remediated by uninstalling or reinstalling the software application.

As an example, a computing device may include one or more processors and one or more non-transitory computer readable media storing instructions executable by one or more processors to perform various operations. The operations may include gathering data, including data associated with events occurring on the computing device. Each event may include a system identifier (e.g., serial number, service tag, or the like) of the computing device, a description of the computing device (e.g., model number, configuration identifier, type of processor, amount of memory, amount and type of storage drive, and the like), a timestamp indicating approximately when the event occurred, and a description of the event. For example, the description of the event may include a heartbeat event indicating that the computing device is functioning properly, a selection event indicating that the user of the computing device made a selection in a user interface (e.g., a dialog box), a software application (including a driver) download, a download of firmware (including a basic input output system (BIOS)) associated with a component (e.g., a network interface card, a graphics card, or another component) of the computing device, successful installation of the downloaded software or the downloaded firmware, failure to install the downloaded software or the downloaded firmware, an installation log, a memory dump as a result of an application crash or an operating system crash, involuntary termination of a software application, an automatic (e.g., not user initiated) restart of the operating system, or another type of event. The computing device may periodically or in response to a particular event (or set of events) send the gathered data to a server.

The server may include one or more processors and one or more non-transitory computer readable media storing instructions executable by one or more processors to perform various operations. The operations may include receiving, from the computing device, data that includes an event that occurred on the computing device. The event may include a unique identifier (e.g., serial number, service tag, or the like) associated with the computing device, a description (e.g., model number, configuration identifier, and the like) of the computing device, a timestamp indicating about when the event occurred, and a description of the event. The description of the event may include at least one of an operating system crash, an install of a particular software application was initiated, the particular software application failed to install, the install of the particular software application was successful, a downloaded software application failed a security hash check, a downloaded firmware failed the security hash check, a heartbeat event, or a selection event (e.g., a dialog box was presented and the user made a particular selection). The operations may include determining a plurality of features associated with the event and determining a distance between individual features of the plurality of features and individual centroids of a plurality of clusters. The events may include determining that a particular distance between a particular feature of the plurality of features and a centroid of a particular cluster of the plurality of clusters is a shorter distance than the distance between other features of the plurality of features and other centroids corresponding to other clusters of the plurality of clusters and determining a classification of the event based on the particular cluster. The operations may include determining that the classification is a remediable issue. The classification may include classifying the event as one of a normal event, a security issue, a bug, or an anomaly. The remediable issue may include at least one of the security issue or the bug. The operations may include selecting and performing, based on the classification, a remediation action from a plurality of remediation actions. The remediation action comprises at least one of: temporarily deactivating an application programming interface (API) key associated with the computing device, or temporarily discarding an additional event received from the computing device. The remediation action may include at least one of: (1) sending a first remediation instruction to the computing device instructing the computing device to: uninstall an application, download a latest version of the application, and install the latest version of the application, (2) sending a second remediation instruction to the computing device instructing the computing device to: download a latest version of firmware associated with component of the computing device, install the latest version of the firmware, or (3) sending a third remediation instruction to the computing device instructing the computing device to: download a latest version of a basic input output system (BIOS) of the computing device, and install the latest version of the BIOS.

FIG. 1 is a block diagram of a system 100 that includes a computing device sending data to a server, according to some embodiments. The system 100 may include multiple computing devices 102 coupled to a server 104 via one or more networks 106. For example, the computing devices 102 may include a computing device 102(1) to computing device 102(N) (where N is greater than 0). The computing devices 102 may include one or more of a laptop, a tablet, a desktop, a smart phone, or another type of computing device.

Each of the computing devices 102 may include an agent 108, an API 114, at least one software application 116, an operating system (O/S) 117, a key 120, and a device profile 110. For example, the computing device 102(1) may include an agent 108(1), an API 114(1), at least one software application 116(1), an O/S 117(1), a key 120(1) and a device profile 110(1). The computing device 102(N) may include an agent 108(N), an API 114(N), at least one software application 116(N), an O/S 117(N), a key 120(N), and a device profile 110(N). Each of the keys 120 may be an API key or equivalent. Each of the APIs 114 may be used, with the corresponding one of the keys 120, to send data 144 (e.g., telemetry data) to the server 104. Each of the device profiles 110 may include a system identifier 112 (e.g., serial number, service tag, or the like) and a set of (e.g., one or more) events 118. Each particular event of the events may include a name or model number of the computing device, a description of the computing device (e.g., Intel® i7 processor, 4 GB RAM, 512 GB SSD, and the like), a timestamp indicating when the particular event occurred, and a description of the event. For example, the description may include a heartbeat message sent periodically to indicate that the computing device is functioning normally, user interface interactions (e.g., button selection), software/firmware download, successful installation of software/firmware, failure to install software/firmware, and the like.

For example, the computing device 102(1) may include the device profile 110(1) that includes system identifier 112(1) and events 118(N). The events 118 may include various events that have occurred on the computing device 102. For example, the events 118 may include when and under what circumstances the software application 116 or the operating system 117 crashed, logs generated by the software application 116 (e.g., installation logs, error logs, crash logs and the like), memory dumps created by the software application 116 or by the operating system 117 of the computing device 102, how many restarts occurred, and whether the restarts were manually initiated, initiated by the software application 116, or initiated by the operating system 117 of the computing device 102, whether the user clicked on a response in a dialog box presented by the agent 108, and other types of events occurring on the computing device 102.

The server 104 may receive the data 144 sent by each of the agents 108 and extract, from the data 144, events 120(1) to 120(M) (where M>0). The events 120 may include the events 118 that the agents 108 send in the data 144 to the server 104. A classifier 122 may use machine learning, such as, for example, K-means clustering, to classify each of the events 120. Of course, other types of classifiers (e.g., that can classify events) may be used instead of K-means clustering.

The classifier 122 may extract a set of features for each of the events 120. For example, the classifier 122 may extract features 124(1) to 124(P) (where P>0) for the event 120(1) and extract features 124(1) to 124(P) for the event 120(M). Thus, the classifier 122 may determine one or more features for each of the events 120 based on one or more rules 130. The number of features that the classifier 122 determines may vary for each of the events 120. For example, one of the events 120 may have three features while another of the events 120 may have seven features. The server 104 may include multiple previously determined clusters, such as a cluster 126(1) to a cluster 126(Q) (where Q>1). Each of the clusters 126 may have a corresponding centroid. For example, the cluster 126(1) may have a corresponding centroid 128(1) and the cluster 126(Q) may have a corresponding centroid 128(Q). The features 124 may include measurable properties or characteristics, such as pass or fail of a security hash check, and the like.

The classifier 122 may determine distances 132 between the features 124 and the centroids 128 and classify each of the events 120 based on a shortest distance between each of the features 124 and the centroids 128. For example, the classifier 122 may classify each of the events 120 as one of a normal event 134, a security issue 136, a bug 138, or an anomaly 140. Of course, other classifications may be used. Each of the classifications 134, 136, 138, and 140 may correspond to one of the clusters 126. For example, an event with features closest to the cluster 126(1) may be classified as the normal event 134, an event with features closest to a cluster 126(2) may be classified as the security issue 136, an event with features closest to a cluster 126(3) may be classified as the bug 138, and an event with features closest to a cluster 126(4) may be classified as the anomaly 140. To illustrate, the classifier 122 may determine that one or more of the features 124 of event 120(M) have the shortest distance to the centroid 128(Q) and may classify the event 120(M) based on the type of event associated with the cluster 126(Q).

In some cases, such as in the case of an event (e.g., one of the events 120) that is classified as the security issue 136 (e.g., hacked, stolen, or spoofed API key), the bug 138, or the anomaly 140, the classifier 122 may select at least one remediation 146 from a set of remediations 142. The server 104 may (1) perform one (or more) of the remediations from the set of remediations 142, (2) send an instruction to perform a remediation 146 to one of the computing devices 102 that is generating the set of events classified as the security issue 136, the bug 138, or the anomaly 140, or (3) both (1) and (2). For example, the remediation actions in the set of remediations 142 may include the server 104 discarding (e.g., without examining or classifying) events received in the data 144 from a particular one of the computing devices 102 or discarding events associated with a particular application executing on a particular one of the computing devices 102. When the bug 138 is being caused by (or is associated with) one of the software applications 116, the remediation 146 may instruct one of the agents 108 to ignore the events 118 caused by the software application 116 being executed by the corresponding computing device 102, instruct the software application 116 to stop sending the data 144, temporarily deactivate the API key 120 of the software application 116, the servers may ignore/discard the data 144 received from the software application 116 (or from the computing device 102), the servers may instruct the computing device 102 to uninstall, download, and reinstall the application 116 (e.g., the reinstall may include installing a more recent version of the application 116), perform another type of remediation, or any combination thereof. For a firmware bug (e.g., a bug in the BIOS or in the firmware of a hardware component such as a disk drive, a network interface card (NIC), a graphics card, or the like), the servers 104 may instruct the agent 108 to ignore the events 118 caused by the firmware, the servers 104 may ignore/discard the events 118 associated with (e.g., caused by) the firmware, the servers 104 may instruct the computing device 102 to download and re-install and/or update the firmware, the servers 104 may instruct the computing device 102 to perform another type of remediation, or any combination thereof. For a hardware bug, the servers 104 may instruct the agent 108 to ignore the events 118 caused by the hardware, the servers 104 may ignore/discard the events 118 associated with the hardware, the servers 104 may issue a service ticket to enable the computing device 102 to be serviced to replace/repair the malfunctioning hardware, perform another type of remediation, or any combination thereof.

Thus, a manufacturer may install a software agent on each computing device that is acquired (e.g., leased or purchased) by a customer (e.g., user). The agent may gather data associated with the computing device and periodically (e.g., at a predetermined time interval) or in response to detecting a particular set of events, send the gathered data to a cloud-based server associated with the manufacturer. The data may include a unique device identifier (e.g., service tag, serial number, or the like) and events that have occurred on the computing device. The events may include software application logs, operating system logs, number of restarts, the cause of the restarts, memory dumps created when an application or the operating system restarts, what responses the user has provided in response to the agent, the software application, or the operating system displaying a user interface in which the user can select one of multiple selections, and the like. The agent, the application, or the operating system may send the data to the server by accessing an API and providing the data and an API key. The API key may indicate that the sender is authorized to send the data to the server.

The server may receive the data sent from each of the computing devices and extract one or more events from the data. Each event may be classified by determining how close each event is to a particular cluster of multiple clusters. For example, for each event, the server may identify one or more features and determine a distance between each feature and a centroid of each cluster. The server may identify the shortest distance between one (or more) features and a particular cluster and classify the event based on the nearest particular cluster. For example, an event may be classified as normal, a security issue, a bug (e.g., software, firmware, or hardware), an anomaly, or another type of event. For some event classifications, such as normal, the server may not perform any remediation. For other event classifications, such as security issue, bug, or anomaly, the server may select and perform one or more remediation actions. For example, for a security issue, such as a compromised (e.g., stolen, hacked, spoofed, or the like) API key, the server may remediate by deactivating the API key to prevent the data from being sent or to enable the server to identify and discard data being sent by a particular agent or software application. A firmware or hardware bug may cause a software application or the operating system to create events by causing the software application or operating system to crash or generate logs. Thus, hardware and firmware bugs may show up as events generated by a software application. For a bug that is causing a large number of events to be generated, the server may remediate by instructing the agent to stop gathering data or instruct the software application to stop generating events (e.g., logs or other events). If more than a predetermined number of computing devices are generating the same (or similar) anomalous events, the particular anomaly may be re-classified as a bug. If more than a predetermined number of the same (or similar) anomalous events are generated by the same computing device, the server may select a remediation action, such as instructing the agent or software application to stop sending data or temporarily deactivating the API key.

Thus, a server may receive hundreds of events per week from millions of computing devices under normal circumstances. If one (or more) particular computing devices begin to send the server an abnormally large (e.g., 20% or more than the average) number of events, then the server may determine, using machine learning (e.g., K-means clustering or the like), what is causing the abnormally large number of events and select one or more remediation actions. The server may perform the remediation, the server may instruct the agent or a software application to perform the remediation, or both. In this way, the server can detect and remediate receiving an abnormally large number of events, reducing the possibility of a denial of service or a server crash.

Figure 2:
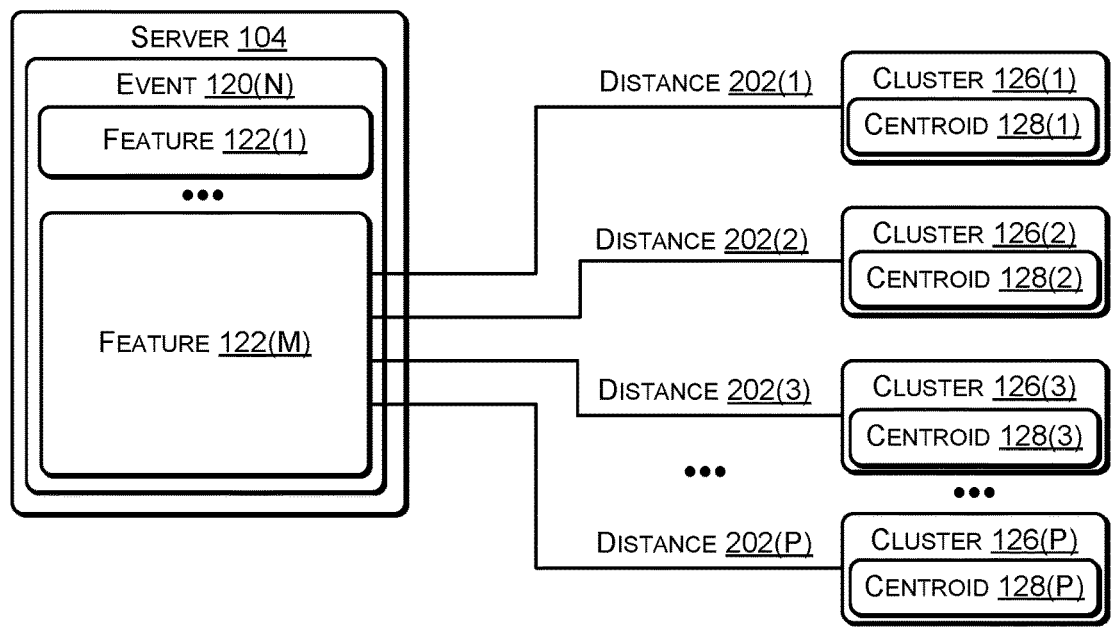
FIG. 2 is a block diagram illustrating determining distances between a particular feature of an event and each cluster of multiple clusters, according to some embodiments.

FIG. 2 is a block diagram 200 illustrating determining distances between a particular feature of an event and each cluster of multiple clusters, according to some embodiments. For each event, such the event 120(N), the server 104 may determine one or more features, such as the features 122(1) to 122(M). For each feature, such as the feature 122(M), the server 104 may determine a distance between the feature and a corresponding centroid of each of the clusters 128. For example, the server 104 may determine: a distance 202(1) between the feature 122(M) and the centroid 128(1) of the cluster 126(1), a distance 202(2) between the feature 122(M) and a centroid 128(2) of a cluster 126(2), a distance 202(3) between the feature 122(M) and a centroid 128(3) of the cluster 126(3), to a distance 202(P) between the feature 122(M) and the centroid 128(P) of the cluster 126(P). The server may determine the shortest of the distances 202 between each of the features 122 and the centroids 128 of the clusters 126 to determine a classification of the event 120(N). Each of the classifications (e.g., 134, 136, 138, and 140 of FIG. 1) may correspond to one of the clusters 126. For example, in FIG. 1, an event with features closest to the cluster 126(1) may be classified as the normal event 134, an event with features closest to a cluster 126(2) may be classified as the security issue 136, an event with features closest to a cluster 126(3) may be classified as the bug 138, and an event with features closest to a cluster 126(4) may be classified as the anomaly 140.

Figure 3:
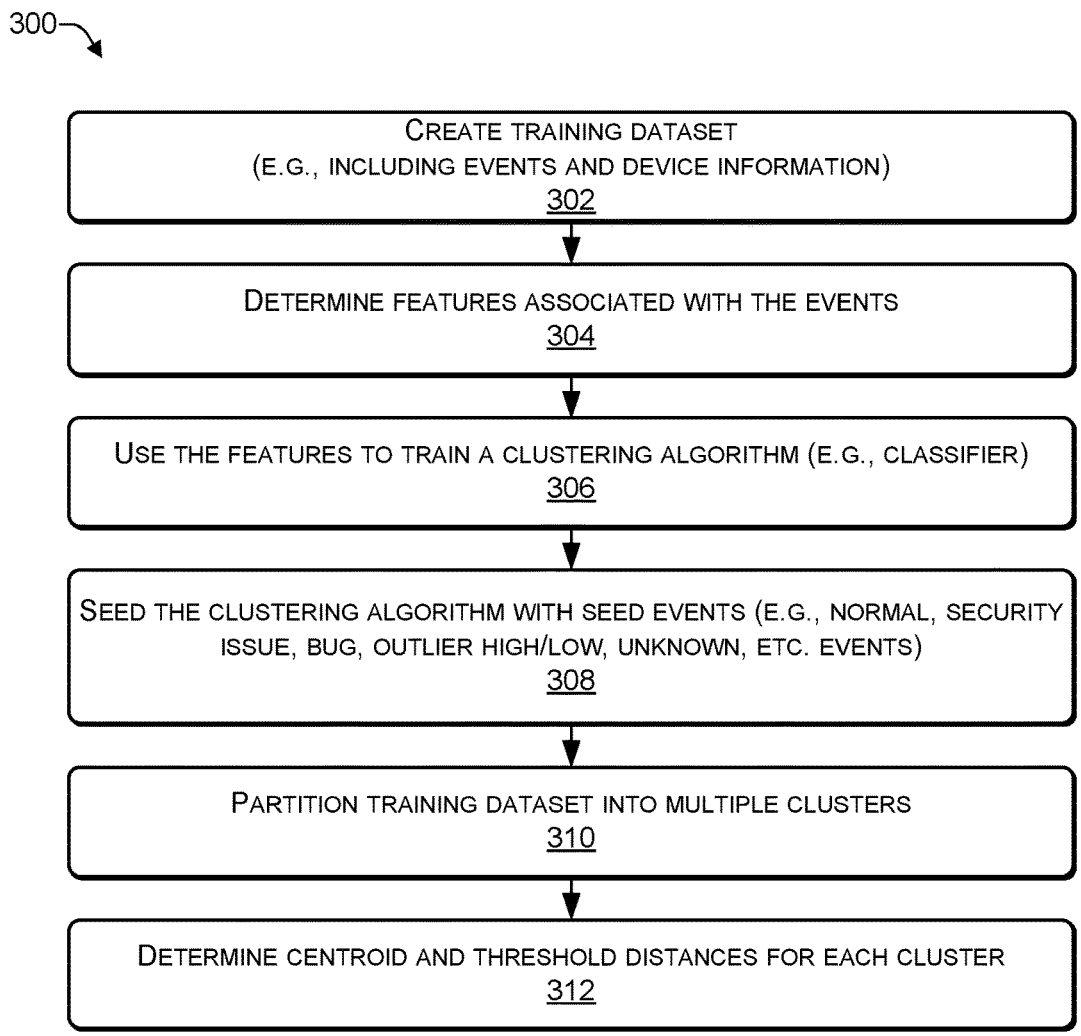
FIG. 3 is a flowchart of a process to create a classifier, according to some embodiments.
Figure 4:
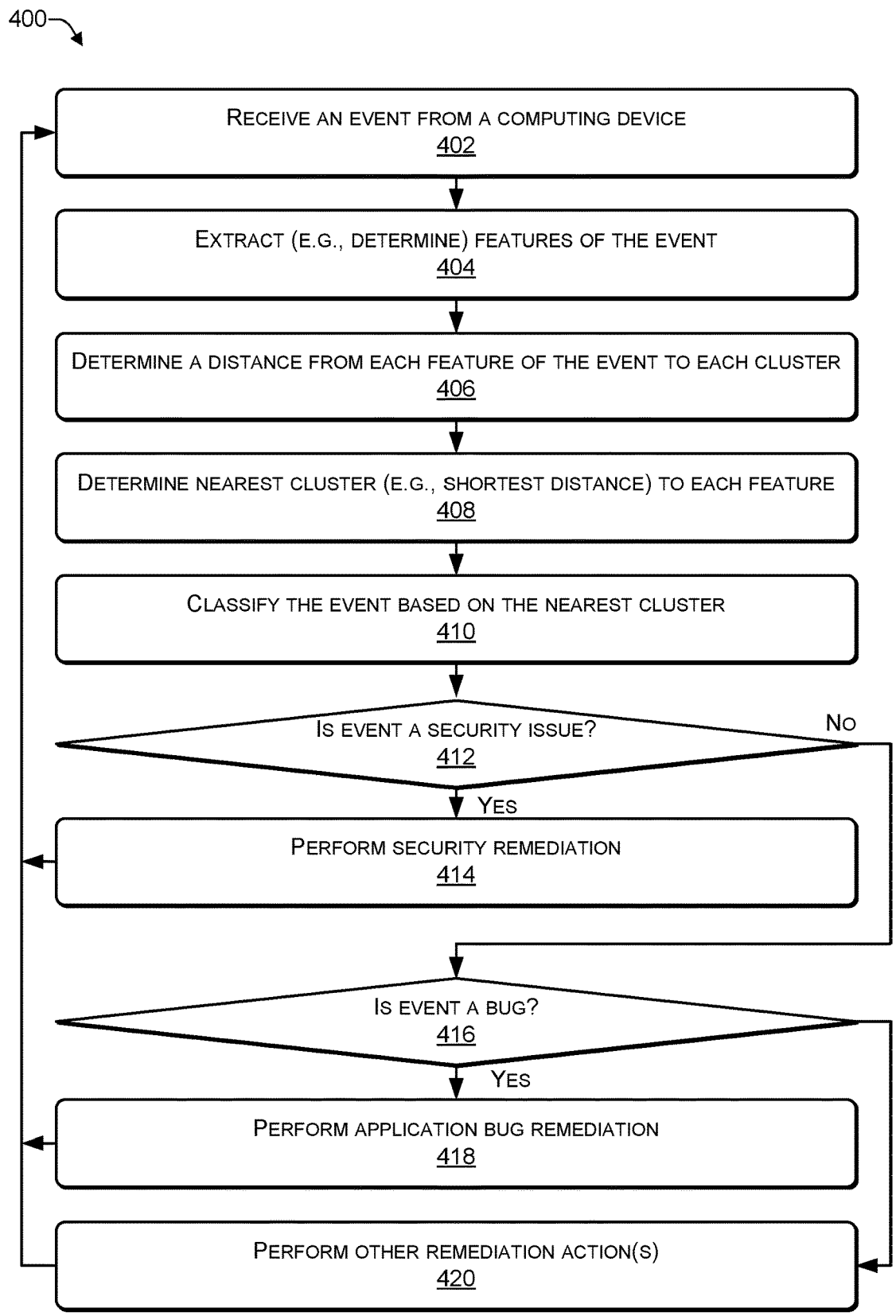
FIG. 4 is a flowchart of a process that includes determining a shortest distance between an event and a cluster, according to some embodiments.

In the flow diagrams of FIG. 3 and FIG. 4, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300 and 400 are described with reference to FIGS. 1 and 2, as described above, although other models, frameworks, systems and environments may be used to implement this process.

FIG. 3 is a flowchart of a process 300 to create a classifier, according to some embodiments. The process 300 may be performed to create the classifier 122 and the clusters 126, before the classifier 122 and the clusters 126 are used by the server 104 to classify events received (e.g., in the telemetry data 144) from the computing devices 102.

At 302, a training dataset may be created. For example, the training dataset may include events that have been manually classified (e.g., by humans) and, in some cases, device information, such as software applications, operating systems, hardware configurations, and the like.

At 304, features may be extracted from the events. At 306, the features may be used to train a clustering algorithm (e.g., a classifier). For example, each event may have one or more features. The features may be extracted and used to train a clustering algorithm.

At 308, the clustering algorithm may be seeded with seed events (e.g., pre-classified events), such as normal events, events caused by a security issue (e.g., hacked, stolen, or spoofed API key), events caused by a bug (e.g., software bug or a software application reacting to a firmware bug or a hardware bug), outlier events (high and low), unknown events, and the like.

At 310, the training data set may be partitioned into multiple clusters. At 312, a centroid and threshold distances (e.g., for what constitutes "near" or "close") may be determined for each cluster. In this way, the clusters and the corresponding centroids may be created. Each cluster may correspond to a particular type of seed event. An event that has a feature with a distance less than a threshold distance from a centroid of a particular cluster may be considered to be "near" or "close" to the cluster and may be classified based on the cluster.

FIG. 4 is a flowchart of a process 400 that includes determining a shortest distance between an event and a cluster, according to some embodiments. The process 400 may be performed by one or more components, such as the classifier 122, of the server 104 of FIG. 1.

At 402, an event may be received from a computing device. At 404, one or more features may be extracted from the event. At 406, a distance between each feature and a centroid of each cluster may be determined. For example, in FIG. 1, the server 104 may receive the data 144 that includes one of the events 118(1) to 118(N) and may store the contents of the data 144 as one or more of the events 120(1) to 120(M). The server 104 may determine one or more of the features 124 associated with one or more of the events 120(1) to 120(M). The server 104 may determine a distance (e.g., the distances 202 of FIG. 2) between each of the features 124 and each of the centroids 128 of the corresponding clusters 126.

At 408, a nearest cluster to each feature may be determined. At 410, the event may be classified based on the nearest cluster. For example, in FIG. 2, the shortest of the distances 202 between each of the features 122 of the event 120(N) and the centroids 128 of the corresponding clusters 126 may be determined to identify a nearest cluster. The event 120(N) may be classified (e.g., as one of a normal event, a security issue, a bug, an anomaly, or the like) based on the nearest cluster.

At 412, a determination may be made whether the event is classified as a security issue. In response to determining, at 412, that "yes" the event is classified as a security issue, one (or more) security remediation actions may be performed, at 414, and the process may proceed to 402 to receive another event. In response to determining, at 412, that "no" the event is not classified as a security issue, the process may proceed to 416 where a determination may be made whether the event is classified as a bug. In response to determining, at 416, that "yes" the event is classified as a bug, one (or more) bug remediation actions may be performed, at 418, and the process may proceed to 402 to receive another event. In response to determining, at 416, that "no" the event is not classified as a bug, the process may perform one or more other remediation actions, at 420, and the process may and the process may proceed to 402 to receive another event. For example, in FIG. 1, the server 104 may, if the event is classified as the security issue 136, the bug 138 or another issue that can be remediated, select one or more appropriate remediation actions from the set of remediations 142. The remediation action may include: (1) the server 104 performing a set of remediation actions, (2) the server 104 sending the remediation instruction 146 to one or more of the computing devices 102 to perform a particular set of remediation actions, or (3) both.

Figure 5:
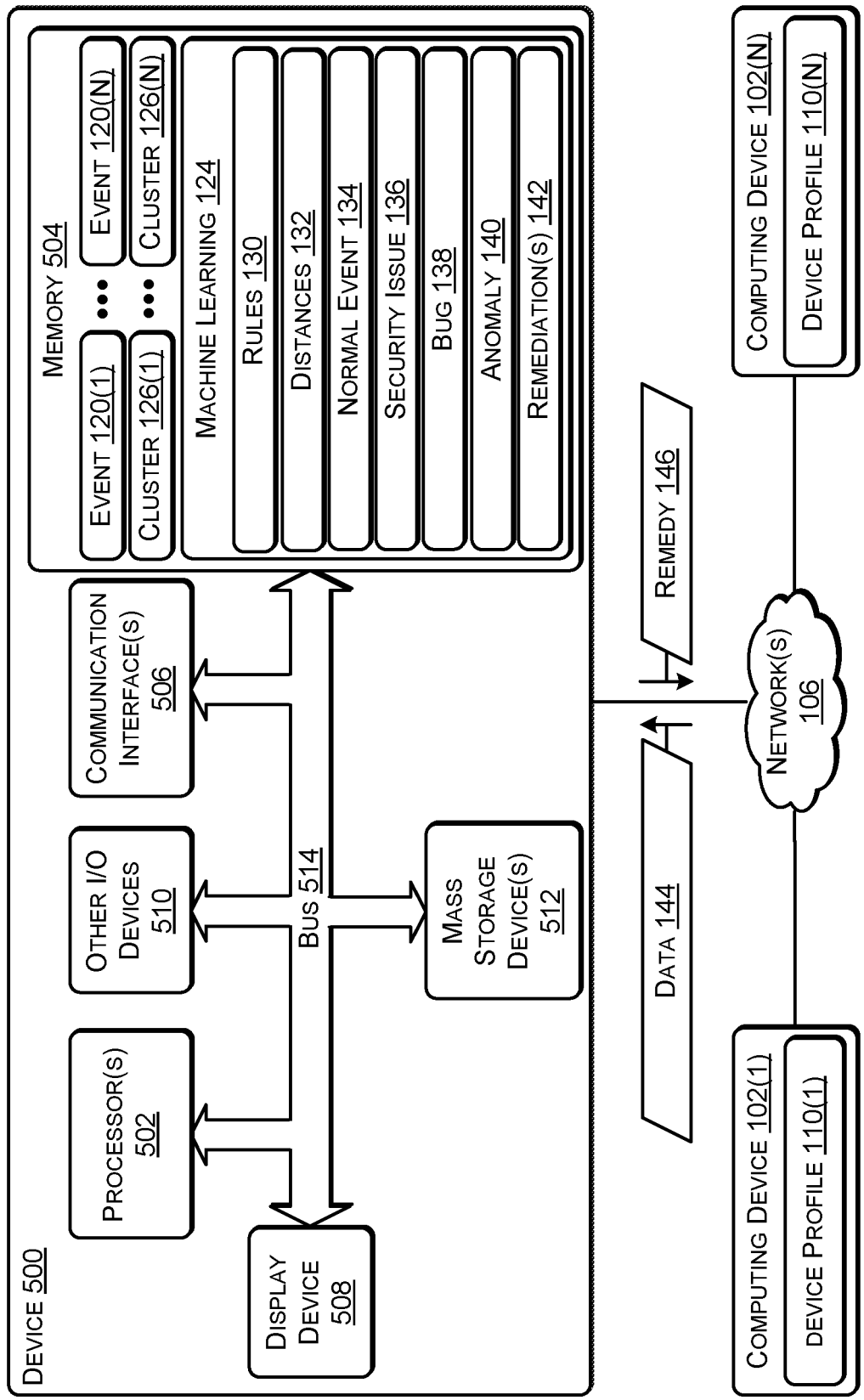
FIG. 5 illustrates an example configuration of a computing device that can be used to implement the systems and techniques described herein.

FIG. 5 illustrates an example configuration of a device 500 that can be used to implement the systems and techniques described herein, such as for example, the computing devices 102 and/or the server 104 of FIG. 1. As an example, the device 500 is illustrated in FIG. 5 as implementing the server 104 of FIG. 1.

The device 500 may include one or more processors 502 (e.g., CPU, GPU, or the like), a memory 504, communication interfaces 506, a display device 508, other input/output (I/O) devices 510 (e.g., keyboard, trackball, and the like), the sensors 206, and one or more mass storage devices 512 (e.g., disk drive, solid state disk drive, or the like), configured to communicate with each other, such as via one or more system buses 514 or other suitable connections. While a single system bus 514 is illustrated for ease of understanding, it should be understood that the system buses 514 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 502 are one or more hardware devices that may include a single processing unit or a number of processing units, all of which may include single or multiple computing units or multiple cores. The processors 502 may include a graphics processing unit (GPU) that is integrated into the CPU or the GPU may be a separate processor device from the CPU. The processors 502 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 502 may be configured to fetch and execute computer-readable instructions stored in the memory 504, mass storage devices 512, or other computer-readable media.

Memory 504 and mass storage devices 512 are examples of computer storage media (e.g., memory storage devices) for storing instructions that can be executed by the processors 502 to perform the various functions described herein. For example, memory 504 may include both volatile memory and non-volatile memory (e.g., RAM, ROM, or the like) devices. Further, mass storage devices 512 may include hard disk drives, solid-state drives, removable media, including external and removable drives, memory cards, flash memory, floppy disks, optical disks (e.g., CD, DVD), a storage array, a network attached storage, a storage area network, or the like. Both memory 504 and mass storage devices 512 may be collectively referred to as memory or computer storage media herein and may be any type of non-transitory media capable of storing computer-readable, processor-executable program instructions as computer program code that can be executed by the processors 502 as a particular machine configured for carrying out the operations and functions described in the implementations herein.

The device 500 may include one or more communication interfaces 506 for exchanging data via the network 110. The communication interfaces 506 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 506 can also provide communication with external storage, such as a storage array, network attached storage, storage area network, cloud storage, or the like.

The display device 508 may be used for displaying content (e.g., information and images) to users. Other I/O devices 510 may be devices that receive various inputs from a user and provide various outputs to the user, and may include a keyboard, a touchpad, a mouse, a printer, audio input/output devices, and so forth.

The computer storage media, such as memory 116 and mass storage devices 512, may be used to store software and data. For example, the computer storage media may be used to store the events 120, the clusters 126, and the machine learning module 124.

Thus, a manufacturer may install a software agent (e.g., agent 108 of FIG. 1) on each of the computing devices 102. The agent may gather data associated with the corresponding one of the computing devices 102 and periodically (e.g., at a predetermined time interval) or in response to detecting a particular set of events, send the gathered data 144 to one or more cloud-based servers (e.g., the device 500). The data 144 may include a unique device identifier (e.g., service tag, serial number, or the like) and events (e.g., events 118 of FIG. 1) that have occurred on one of the computing devices 102. The events may include software application logs, operating system logs, number of restarts, the cause of the restarts, memory dumps created when an application or the operating system restarts, what responses the user has provided in response to the agent, a software application, or an operating system displaying a user interface in which the user can select one of multiple selections, and the like. The agent, the application, or the operating system may send the data 144 to the server (e.g., the device 500) by accessing an API (e.g., the API 114 of FIG. 1) and providing the data 144 and an API key (e.g., the API key 114). The API key may indicate that the sender is authorized to send the data 144 to the server.

The server may receive the data 144 sent from each of the computing devices 102 and extract one or more events from the data 144 and store the events as one or more of the events 120. Each of the events 120 may be classified by determining how close each feature of each event is to one of the clusters 126. For example, for each of the events 120, the server may identify one or more features and determine a distance between each feature and a centroid of each of the clusters 126, as described above in FIGS. 1 and 2. The server may identify the shortest distance between one (or more) features and a particular cluster and classify the event based on the nearest particular cluster. For example, an event may be classified as normal, a security issue, a bug (e.g., software, firmware, or hardware), an anomaly, or another type of event. For some event classifications, such as normal, the server may not perform any remediation. For other event classifications, such as security issue, bug, or anomaly, the server may select and perform one or more remediation actions. For example, for a security issue, such as a compromised (e.g., stolen, hacked, spoofed, or the like) API key, the server may remediate by deactivating the API key to prevent the data from being sent or to enable the server to identify and discard data being sent by a particular agent or software application. A firmware or hardware bug may cause a software application or the operating system to create events by causing the software application or operating system to crash or generate logs. Thus, hardware and firmware bugs may show up as events generated by a software application. For a bug that is causing a large number of events to be generated, the server may remediate by instructing the agent to stop gathering data or instruct the software application to stop generating events (e.g., logs or other events). If more than a predetermined number of computing devices are generating the same (or similar) anomalous events, the particular anomaly may be re-classified as a bug. If more than a predetermined number of the same (or similar) anomalous events are generated by the same computing device, the server may select a remediation action, such as instructing the agent or software application to stop sending data or temporarily deactivating the API key. Of course, other types of remediation actions may be performed by the server, one or more of the computing devices 102, or both.

Thus, a server may receive hundreds of events per week from millions of computing devices under normal circumstances. If one (or more) particular computing devices begin to send the server an abnormally large (e.g., 20% or more than the average) number of events, then the server may determine, using machine learning (e.g., K-means clustering or the like), what is causing the abnormally large number of events and select one or more remediation actions. The server may perform the remediation, the server may instruct the agent or a software application to perform the remediation, or both. In this way, the server can detect and remediate receiving an abnormally large number of events, reducing the possibility of a denial of service or a server crash.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving, by one or more processors and from a computing device, data identifying an event that occurred on the computing device;
   determining, by the one or more processors, a plurality of features associated with the event;
   determining, by the one or more processors, a distance between individual features of the plurality of features and individual centroids of a plurality of clusters;
   determining, by the one or more processors, that a particular distance between a particular feature of the plurality of features and a centroid of a particular cluster of the plurality of clusters is a shorter distance than the distance between other features of the plurality of features and other centroids corresponding to other clusters of the plurality of clusters;
   determining, by the one or more processors, a classification of the event based on the particular cluster;
   determining, by the one or more processors, that the classification is a remediable issue;
   selecting, by the one or more processors and based on the classification, a remediation action from a plurality of remediation actions; and
   performing, by the one or more processors, the remediation action.

2. The method of claim 1, wherein the event comprises:
   a name of the computing device;
   a description of the computing device;
   a timestamp indicating when the event occurred; and
   a description of the event.

3. The method of claim 2, wherein the description of the event comprises at least one of an operating system crash, an install of a particular software application was initiated, the particular software application failed to install, the install of the particular software application was successful, a downloaded software application failed a security hash check, a downloaded firmware failed the security hash check, a heartbeat event, or a selection event.

4. The method of claim 1, wherein the classification comprises one of a normal event, a security issue, a bug, or an anomaly.

5. The method of claim 4, wherein the remediable issue comprises one of the security issue or the bug.

6. The method of claim 1, wherein the remediation action comprises at least one of:
   temporarily deactivating an application programming interface (API) key associated with the computing device; or
   temporarily discarding an additional event received from the computing device.

7. The method of claim 1, wherein the remediation action comprises at least one of:
   sending a first remediation instruction to the computing device instructing the computing device to:
   uninstall an application;
   download a latest version of the application; and,
   install the latest version of the application;
   sending a second remediation instruction to the computing device instructing the computing device to:
   download a latest version of firmware associated with component of the computing device; and,
   install the latest version of the firmware; or
   sending a third remediation instruction to the computing device instructing the computing device to:
   download a latest version of a basic input output system (BIOS) of the computing device; and,
   install the latest version of the BIOS.

8. A server comprising:
   one or more processors; and
   one or more non-transitory computer readable media storing instructions executable by the one or more processors to perform operations comprising:
   receiving, from a computing device, data identifying an event that occurred on the computing device;
   determining a plurality of features associated with the event;
   determining a distance between individual features of the plurality of features and individual centroids of a plurality of clusters;
   determining that a particular distance between a particular feature of the plurality of features and a centroid of a particular cluster of the plurality of clusters is a shorter distance than the distance between other features of the plurality of features and other centroids corresponding to other clusters of the plurality of clusters;
   determining a classification of the event based on the particular cluster;
   determining that the classification is a remediable issue;

selecting, based on the classification, a remediation action from a plurality of remediation actions; and
performing the remediation action.

9. The server of claim 8, wherein the event comprises:
a name of the computing device;
a description of the computing device;
a timestamp indicating when the event occurred; and
a description of the event.

10. The server of claim 9, wherein the description of the event comprises at least one of an operating system crash, an install of a particular software application was initiated, the particular software application failed to install, the install of the particular software application was successful, a downloaded software application failed a security hash check, a downloaded firmware failed the security hash check, a heartbeat event, or a selection event.

11. The server of claim 8, wherein:
the classification comprises one of a normal event, a security issue, a bug, or an anomaly; and
the remediable issue comprises one of the security issue or the bug.

12. The server of claim 8, wherein the remediation action comprises at least one of:
temporarily deactivating an application programming interface (API) key associated with the computing device; or
temporarily discarding an additional event received from the computing device.

13. The server of claim 8, wherein the remediation action comprises at least one of:
sending a first remediation instruction to the computing device instructing the computing device to:
uninstall an application;
download a latest version of the application; and,
install the latest version of the application;
sending a second remediation instruction to the computing device instructing the computing device to:
download a latest version of firmware associated with component of the computing device; and,
install the latest version of the firmware; or
sending a third remediation instruction to the computing device instructing the computing device to:
download a latest version of a basic input output system (BIOS) of the computing device; and,
install the latest version of the BIOS.

14. One or more non-transitory computer readable media storing instructions executable by one or more processors to perform operations comprising:
receiving, from a computing device, data identifying an event that occurred on the computing device;
determining a plurality of features associated with the event;
determining a distance between individual features of the plurality of features and individual centroids of a plurality of clusters;
determining that a particular distance between a particular feature of the plurality of features and a centroid of a particular cluster of the plurality of clusters is a shorter distance than the distance between other features of the plurality of features and other centroids corresponding to other clusters of the plurality of clusters;
determining a classification of the event based on the particular cluster;
determining that the classification is a remediable issue;
selecting, based on the classification, a remediation action from a plurality of remediation actions; and
performing the remediation action.

15. The one or more non-transitory computer readable media of claim 14, wherein the event comprises:
a name of the computing device;
a description of the computing device;
a timestamp indicating when the event occurred; and
a description of the event.

16. The one or more non-transitory computer readable media of claim 14, wherein the description of the event comprises at least one of an operating system crash, an install of a particular software application was initiated, the particular software application failed to install, the install of the particular software application was successful, a downloaded software application failed a security hash check, a downloaded firmware failed the security hash check, a heartbeat event, or a selection event.

17. The one or more non-transitory computer readable media of claim 14, wherein:
the classification comprises one of a normal event, a security issue, a bug, or an anomaly.

18. The one or more non-transitory computer readable media of claim 17, wherein:
the remediable issue comprises one of the security issue or the bug.

19. The one or more non-transitory computer readable media of claim 14, wherein the remediation action comprises at least one of:
temporarily deactivating an application programming interface (API) key associated with the computing device; or
temporarily discarding an additional event received from the computing device.

20. The one or more non-transitory computer readable media of claim 14, wherein the remediation action comprises at least one of:
sending a first remediation instruction to the computing device instructing the computing device to:
uninstall an application;
download a latest version of the application; and,
install the latest version of the application;
sending a second remediation instruction to the computing device instructing the computing device to:
download a latest version of firmware associated with component of the computing device; and,
install the latest version of the firmware; or
sending a third remediation instruction to the computing device instructing the computing device to:
download a latest version of a basic input output system (BIOS) of the computing device; and,
install the latest version of the BIOS.

* * * * *